May 12, 1931. J. J. MOJONNIER 1,804,701
CHAIN CONVEYER
Filed April 1, 1929 3 Sheets-Sheet 1
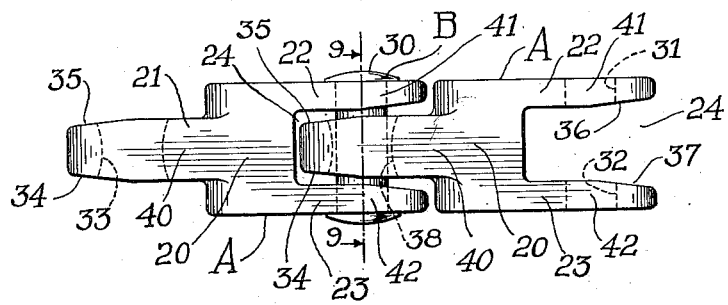
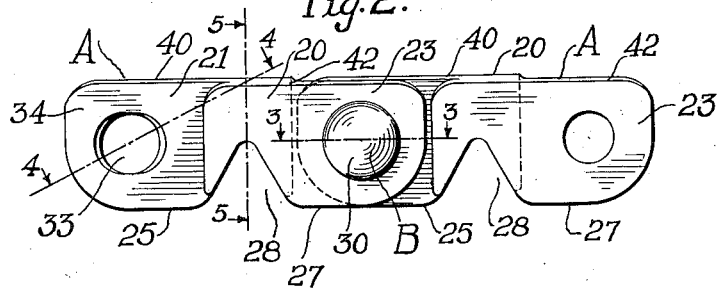
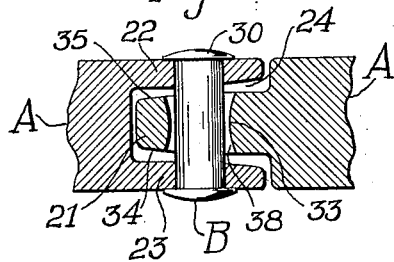 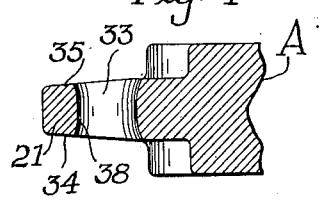 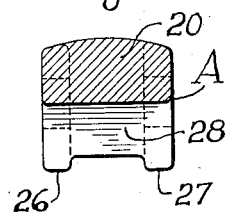
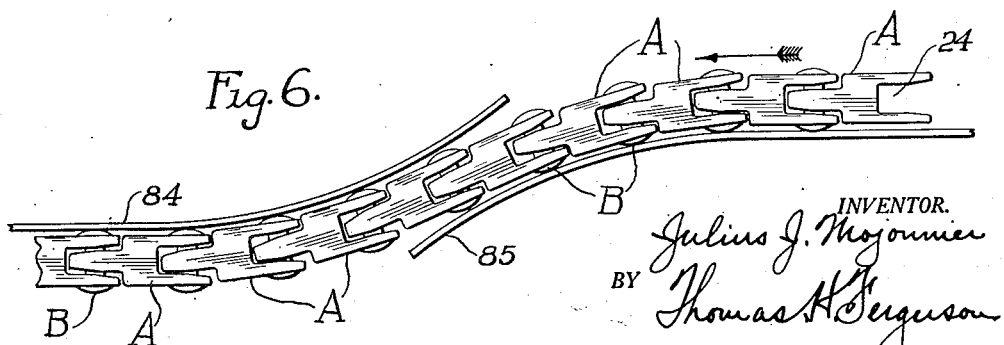
INVENTOR.
Julius J. Mojonnier
BY Thomas H. Ferguson
ATTORNEY.

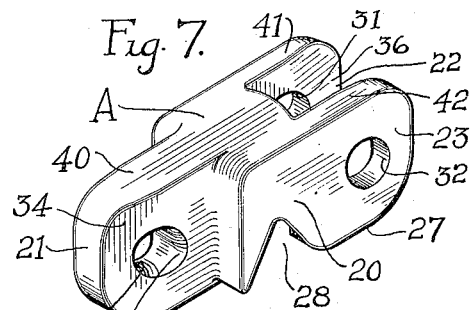
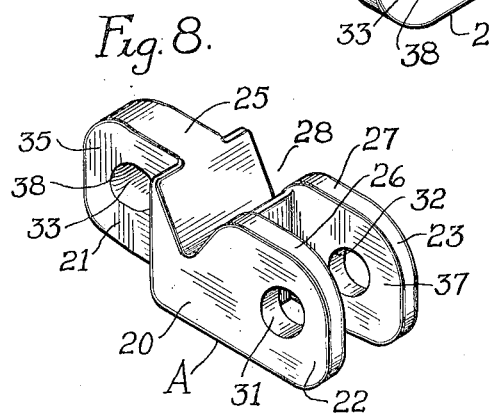
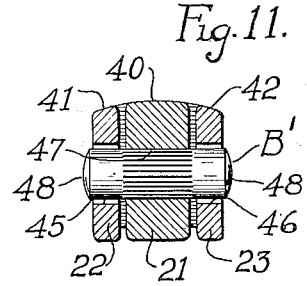
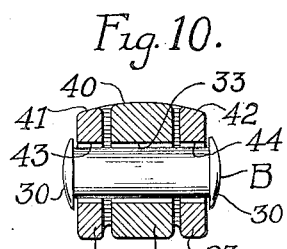
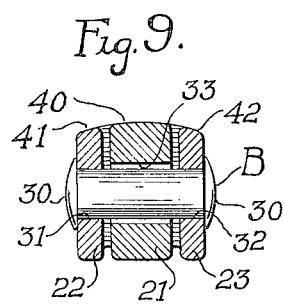
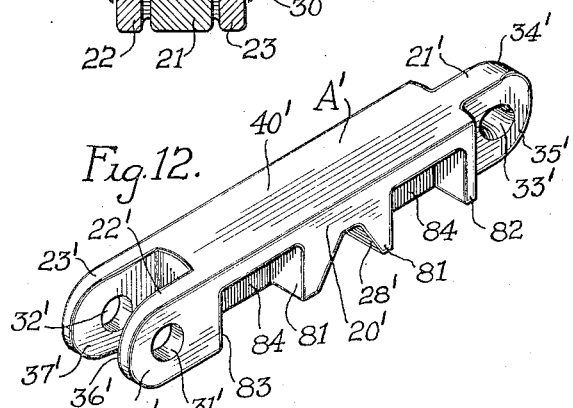
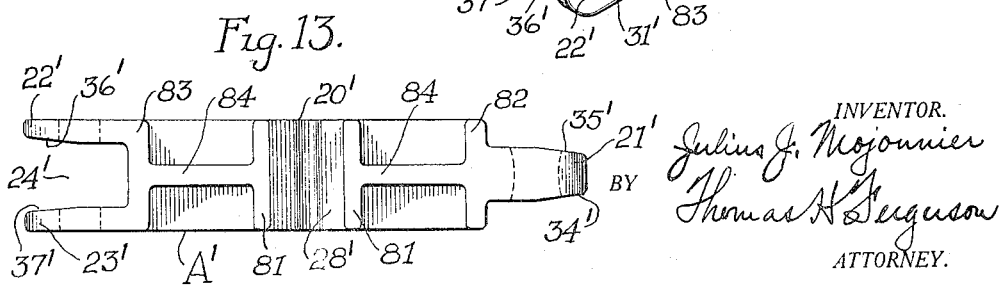

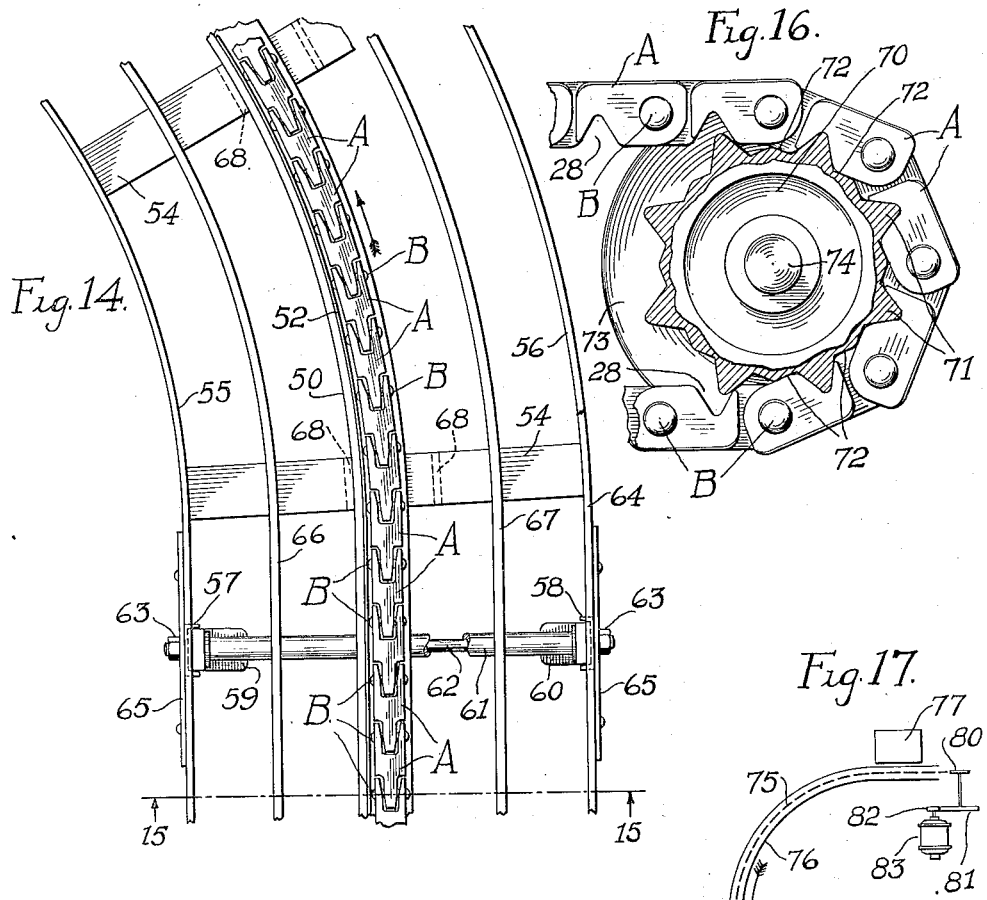
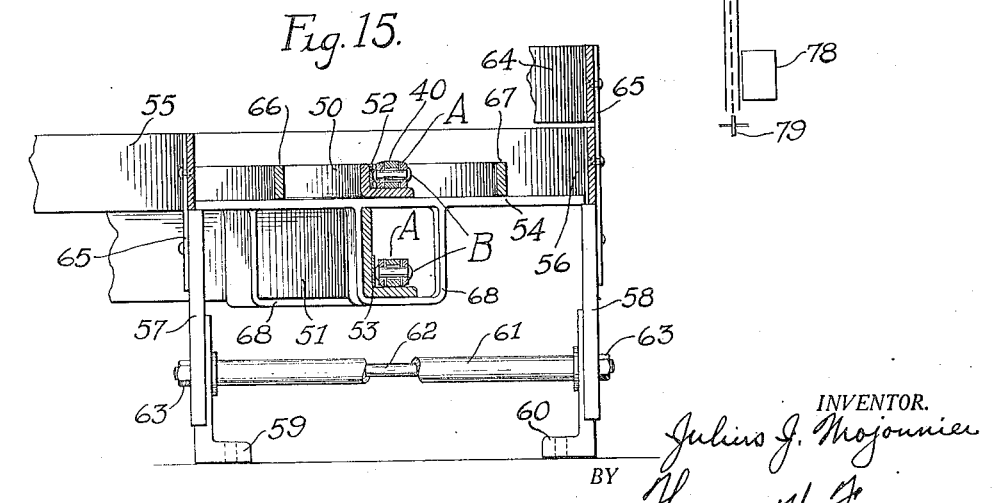

Patented May 12, 1931

1,804,701

UNITED STATES PATENT OFFICE

JULIUS J. MOJONNIER, OF OAK PARK, ILLINOIS, ASSIGNOR TO MOJONNIER BROS. CO., A CORPORATION OF ILLINOIS

CHAIN CONVEYER

Application filed April 1, 1929. Serial No. 351,620.

The present invention relates to chain conveyers of the class wherein the links have upper bearing surfaces upon which the commodity rides as it is being forwarded. The invention is capable of use in many fields of activity but has been devised more particularly with a view to use in creameries, ice cream factories, and like places where commodities are conveyed from point to point, principally horizontally, or practically so, amid extreme and variable atmospheric conditions due to the use of steam, water, and high and low temperatures, the latter often going as low as from 10 to 25 degrees below zero.

One object of the invention is to produce a conveyer capable of use under these extreme conditions which shall be durable.

Another object is to provide a chain conveyer wherein the chain will travel along horizontally curved paths while at the same time the links will remain upright and will therefore present a uniform commodity engaging surface at all points throughout the length of the conveyer whether traversing straight or curved paths.

Another object is to provide a chain which may be loaded at any point by shoving cans or other articles upon it from the side and which will at the same time provide such a limited contact with the articles being carried as to readily slip along under them in case of a collection or jam of articles in the conveyer. It is also my aim to so design the chain that these operations may be had without materially increasing the load on the electric motor or other driving means.

Another object is to utilize the ends of the pivot pins which connect the links, as wearing members to remove wear from the bodies of the links themselves. These pins are small and are preferably harder than the links. By using the links in this way the life of the conveyer is greatly increased and its operation is brought about with a minimum of driving power.

Other objects are to design the links so that the chain may be driven in either direction, construct the complete conveyer so that it may carry a great variety of objects, and simplify the construction of both links and supporting frame so that the same may be economically manufactured and installed as well as economically and efficiently operated.

With these objects in view, I preferably construct the conveyer chain by pivoting together integral metal links. Ordinarily each link is a casting having a central blocklike body provided with terminal projections through which the pivot pins pass. There are preferably three projections from each link, one extending from one end and the remaining two from the other end. These projections are flat, leaf-like members which lie in parallel, vertical planes. The one projection extends from the center of one end of the body and the other two are spaced apart and extend from the outer portions of the other end of the body. The space provided between the pair of projections is sufficiently wide to loosely receive the single central projection of the next link. Thus, three overlapping projections or leaves are present between each two link bodies. The pivot pin passing through the interleaved projections has a loose connection with at least one of the projections. The loose connection at the pivot combined with the loose fit of the central projection or tongue in the slot or space between the outer projections or tongues enables the links to be moved relatively in planes including the axis of the intervening pivot pin. In other words, the loose fit at the two points allows the chain to travel around curves in a horizontal plane while maintaining the links upright and the pivot pins horizontal.

Of course, too, the links are movable about their pivot pins in the vertical plane and hence move readily about the driving and guiding wheels over which they travel.

By this construction great economies are possible in many installations over what would be possible with straight-a-way units, that is, units the chains of which are capable of operating only in vertical planes. By my new conveyer it is possible to reach more points with a given expenditure of power than would be possible were the straight-away units only used.

The general link construction of the present invention is the outgrowth of the link construction of my prior application Serial No. 109728, filed May 17, 1926 issued as Patent No. 1,714,721, granted May 28, 1929. Insofar as there is anything in common in the links and chain disclosed in the two cases that common matter has been reserved for claims in the present case, thus maintaining a proper line of division between the two cases.

The several objects and features of my invention will be more fully understood upon reference to the following detailed description taken in connection with the accompanying drawings while the scope of the invention will be particularly pointed out in the appended claims.

In said drawings, Fig. 1 is a plan view of two connected links of a conveyer chain constructed in accordance with the present invention; Fig. 2 is a side elevation of the same two links; Fig. 3 is a horizontal section through the pivot pin connecting the same two links, the plane of section being indicated by the line 3—3 of Fig. 2; Fig. 4 is an oblique section taken on a plane indicated by the line 4—4 of Fig. 2 and showing particularly the bearing surfaces of the walls of the enlarged opening through the central projection of one of the links; Fig. 5 is a transverse vertical section through one of the links, the plane of section being indicated by the line 5—5 of Fig. 2; Fig. 6 is a diagrammatic plan view illustrating several links of a chain wherein the links are shown traveling around curves in a horizontal plane; Fig. 7 is a perspective view of one of the links viewed from the top; Fig. 8 is a perspective view of the same link viewed from the bottom; Fig. 9 is a transverse vertical section taken on a plane indicated by the line 9—9 of Fig. 1 and illustrating the preferred pivot pin arrangement; Fig. 10 is a similar transverse view illustrating a modified pivot pin arrangement wherein the pivot pin passes loosely through all projections; Fig. 11 is a similar view illustrating a second modified pin arrangement wherein the pin is rigidly secured to the central projection and passes loosely through elongated openings in the two outer projections; Fig. 12 is a perspective view of a modified link having a long central body; Fig. 13 is a bottom plan view of the same; Fig. 14 is a plan view of a portion of a complete conveyer employing the conveyer chain illustrated in the early figures; Fig. 15 is a transverse vertical section of said conveyer, the plane of the section being indicated by the line 15—15 of Fig. 14; Fig. 16 is a side elevation of a portion of the conveyer chain and a cooperating wheel having its periphery toothed to fit the conveyer chain, the wheel being shown in central section; and Fig. 17 is a diagrammatic view, on a small scale, of a conveyer constructed in accordance with the present invention wherein the chain travels around a horizontal curve extending through 90 degrees. Throughout these views, like characters refer to like parts.

Referring to said drawings in detail and more particularly at first to the chain, A designates the links, and B, the pivot pins by which the links are connected. Each link A comprises a central block-like body 20 and oppositely extending projections 21 at the one end and 22, 23 at the other end. As clearly shown the projection 21 extends from the central portion of the link and the projections 22 and 23 extend from the outer portions, the latter thus leaving an intervening space 24. As clearly shown, the space 24 is wide enough to take in the projection 21 with a loose fit. All these projections 21, 22, and 23 lie in vertical planes and when assembled each pair of links has intervening a set of three projections 22, 21 and 23, connected by the pivot pin B. The projections 21, 22 and 23 are curved at their outer ends to form runner-like surfaces 25, 26 and 27. By reason of this runner-like construction, the links pass easily in either direction over the surface of a guideway readily riding over any slight irregularities or obstructions. In the preferred construction the projections 21, 22 and 23 are of practically the same vertical extent but the central projection is considerably wider than the outer ones. This is to give each link the same strength at each pivot pin, the cross-sectional area of the central projection equalling the aggregate of the cross-sectional areas of the outer projections. The thick central tongue also gives a large wearing surface to contact with the pin and it is obviously desirable to have this wearing surface as large as possible, due regard being given to other factors. The central block-like body 20 is shaped on its under side so as to provide a transverse re-entrant space 28. This space is a tooth space and its walls are shaped to be engaged by the walls of the teeth of sprocket wheels upon which the conveyer belt travels.

In the preferred construction, the pivot pin B is cylindrical throughout its central portion but has heads 30 struck up at its opposite ends. Preferably the pin B closely fits the openings 31 and 32 in the outer projections 22 and 23, but passes loosely through the opening 33 of the central projection 21. In this way the pin B is fixed at its ends to the pair of tongues of one link and passes freely through the opening of the single tongue of the next link. By means of this loose connection between the pin B and the central tongue 21 it is clear that the two links A which are thus united may be moved in planes which include the axis of the pivot pin. With this construction it will be seen that when the links travel along their runner surfaces 25, 26, and 27 adjacent links may be moved horizontally relative to each other in the manner depicted in Fig. 6. As there shown the movement may be in either direction from a given vertical plane.

As stated, the tongue 21 fits loosely in the space or slot 24. It will be apparent that the range of horizontal movement, provided the pin B is sufficiently loose in the opening 33 so as not to bind, may be increased by beveling the outer faces of the projection 21 and the inner faces of the projections 22 and 23. The beveled walls of the central projection 21 are shown at 34 and 35. The corresponding bevels on the oppositely extending projections 21 and 23 are shown at 36 and 37, respectively.

Obviously, the horizontal movement we have been speaking of may be obtained without giving particular attention to the shape of the opening 33 in the tongue 21, provided only that said opening be large enough. However, it is preferable to provide a good bearing face upon the interior of the opening 33 so that for different angular positions of adjacent links, measured in a horizontal plane, there will be a good bearing contact for each position. For this purpose with a cylindrical pin B the hole 33 is preferably elongated and the inner walls toward the ends of the link, that is to say in a horizontal plane, are beveled from the outside or rounded off in the manner indicated at 38. As shown by the curvature at 38 in Figs. 3 and 4, there is a suitable bearing surface for the pin whether the links are traveling horizontally or one link is swung down in a vertical plane relative to the other while at the same time going around a curve in a horizontal direction.

The links A are preferably hardened cast steel and the pins B are preferably chrome steel. Consequently, the pins are harder than the links. As a result the heads 30 formed on the pins B constitute excellent wearing ends or members for contact with a wear plate upon the conveyer structure. But in any event, the material of the pins should be harder than the material of the links.

In order to provide a bearing surface for the commodity carried by the conveyer, and to provide a surface which will permit the chain to slip beneath the commodity, or the containers in which the commodity is located, whenever there is an accumulation or jam of articles on the conveyer, I arrange the upper surface of each link with a central ridge 40. This ridge extends throughout the length of the projection 21 and the block 20. In other words, it is limited at one end by the end of the central projection, and at the other end by the slot 24. This ridge 40 is in reality formed by giving the top of the body 20 a longitudinal convex cylindrical surface, or a surface approaching such cylindrical surface, and then giving the central projection 21 the same height and upper surface contour as the central portion of the body. The portions of the upper surface of the link outward of the central ridge 40 are inclined downward, as indicated at 41 and 42. These portions are provided by giving the outer projections 22 and 23 the same height and upper surface contour as the outer portions of the body. When the links are assembled, the ridges 40 on the adjacent links are aligned. Thus the entire chain is crowned. It is this transverse crown of the chain that engages the commodity and carries it along. The outer portions 41 and 42 being inclined inwardly and upwardly, serve as guiding surfaces whenever a can or other container is loaded on to the conveyer chain from the side. By shoving the article over the inclined surface 41 or 42, it is moved into riding engagement with the upper ridge 40.

As a modified pivot arrangement, I may make the holes in the outer projections or leaves 22, 23 somewhat larger than necessary to give a tight fit, as was the case in the form of the invention illustrated in Fig. 9. Such a modification is illustrated in Fig. 10, wherein the holes 43 and 44 are shown somewhat larger than the corresponding holes 31 and 32 of the Fig. 9 embodiment. The central hole 33 may be left the same as in the first mentioned form of the invention. With this arrangement the heads 30 of the pin B serve as wearing ends, just as before described, and the central opening 33 is sufficiently large to give the necessary horizontal movement of the links when passing around horizontal curves.

A still further modification is shown in Fig. 11, wherein the pin B' is shown as a straight pin having a loose fit with the openings 45 and 46 of the outer projections or leaves 22, 23, respectively, and a tight fit with the opening 47 in the central projection 21. In assembling the parts, the fit with the opening 47 may be a drive fit. In the illustration the central portion of the pin is shown knurled to assist in making a tight fit when driven home. Other ways of making the pin rigid with the central projection may also be employed. With this arrangement, too, the necessary lateral oscillations are obtained by reason of the ends of the pin B' moving freely to and fro in the large openings 45 and 46. If desired, the latter may be elongated in a manner similar to the opening 33 previously described. The ends 48 of the pin B' extend beyond the outer walls of the link projections 22 and 23 and serve, like the heads 30, as wearing members engaging wear plates on the supporting structure.

Obviously, too, the links may be varied in length. Thus, in Figs. 12 and 13 I have shown a link of the general construction shown in my aforesaid application Serial No. 109728, but having its projections modified in accordance with the novelty herein presented. In this case the link, designated A′, has an elongated body 20′ and relatively short central and outer projections 21′, 22′ and 23′. Its upper surface is convexly curved so as to give a commodity carrying ridge or elevated surface 40′ like the surface 40 heretofore described. The projection 21′ is also wider than either projection 22′ or 23′ and it fits loosely into the space 24′. The holes 31′ and 32′ are adapted to closely fit the pivot pin B and the central hole 33′ is elongated the same as hole 33. This is the pivot pin arrangement of Fig. 9 but obviously the arrangements of Fig. 10 or 11 might be used equally as well. The outer ends of the projections are also beveled at 34′, 35′, 36′ and 37′ similarly to the links B at the corresponding points 34, 35, 36 and 37.

As clearly shown, each link A′ is provided on its under side with a reentrant tooth space 28′. This tooth space is preferably located at or near the center of the link and its walls 81 extend the entire width of the link. Preferably also other portions of the same side of the link, such as the portions 82 and 83, extend the entire width of the link. The portions 81, 82, and 83 have flat surfaces that lie in the same plane and thereby engage the flat surface of the guideway over which the link travels when loaded, thereby maintaining the link always in the same position and with a solid support formed by this substantial engagement of the links with the guideway, no matter whether going along rectilinear paths or around curves in a horizontal plane. Central webs 84 connect the portions 81, 83 on the one hand and 81, 82 on the other.

To illustrate the way in which the chain I have been describing is to be used in practice, I have shown in Figs. 14 and 15 views of a portion of a conveyer constructed in accordance with the present invention. Obviously, the frame work of the conveyer may take different forms. The one illustrated, therefore, is to be taken typically, although the same is a reproduction of a portion of an actual installation. In this instance, the upper stretch of the chain travels on an angle iron 50, while the lower stretch travels on a similar angle iron 51. These angle irons constitute guideways having rectilinear and curved portions. The lower portion, as shown in Fig. 14, is rectilinear, and the upper portion is curved upward to the left. The angle iron 50 carries a wear plate 52 which extends along the inner side of the upper arm of the angle iron 50. This wear plate extends throughout the length of the curved portions of the conveyer and, if desired, may extend along the rectilinear portions also. A similar wear plate 53 is positioned upon the vertical leg of the angle iron 51, and is preferably co-extensive in length with the wear plate 52. As clearly shown, the ends of the pivot pins B bear against the wear plates 52 and 53. The latter are composed of material that is somewhat softer than the pivot pins B and, consequently, whatever wear takes place by reason of the frictional engagement of the parts occurs upon the wear strips. The wear strips 52 may be composed of phosphor bronze and when so composed will work well with pins B of chrome steel and links A of hardened cast steel. These are preferably arranged so that they may be removed and replaced by new wear plates whenever that is necessary.

In the present instance, the angle bar 50 is supported at regular intervals by cross bars 54 which are carried at their ends by longitudinal plates 55 and 56, which are in turn supported at intervals by uprights 57 and 58, which carry feet 59 and 60 at their lower ends. A spacing tube 61 and a cooperating bolt 62 serve to hold the shoes and their uprights in proper spaced relation, nuts 63 upon the bolt 62 being used to hold the parts firmly together. The plates 55 and 56 constitute the side walls of the conveyer and are rectilinear where the angle bars 50 and 51 are rectilinear, and curved where the latter are curved. In the particular installation here illustrated, the plate 56 is supplemented by a plate 64 which is similar to the plate 56 and secured above it at suitable intervals by straps 65, or the like. In this instance, too, the cross bars 54 carry bars 66 and 67 which are shaped to conform to the straightness or curvature of the intervening angle bar 50. The bars 66 and 67 are of the same height as the vertical leg of the angle bar 50. The upper ridge 40 of the chain rises slightly above the horizontal plane passing through the tops of these members 50, 66 and 67. In the instance illustrated, the conveyer is designed to carry milk bottle cases and, consequently, the three contact points constitute a sufficient floor for the conveyer. The ridge 40 of the chain extends high enough above the plane of the tops of these members to engage the milk bottle cases with sufficient force to carry them along. The lower angle bar 51 which carries the return stretch of the chain is supported at intervals by stirrups 68 secured to the cross bars 54. As before stated, all these parts may be varied to suit the circumstances of any given installation problem.

In order to show how the chain links are engaged by a cooperating sprocket wheel, whether a driven wheel or an idler, I have illustrated in Fig. 16 a wheel 70 having teeth 71 for engaging the tooth spaces 28 upon the short chain links. Each tooth 71 is located at the center of a flat portion 72 of the periphery of the wheel. This flat portion is of a length suited to the length of the links. The teeth 71 extend transversely between flanges 73 which extend outward from the base surfaces 72 a distance substantially equal to the height of the links. The wheel 70 is suitably mounted on a transverse shaft or axle 74. For the longer links A', the sheave might be designed along the same lines as the sheave 70 but obviously the polygonal faces 72 from which the teeth 71 rise would have to be longer in order to suit the pitch of the chain having the longer links. These designs are similar to those shown in my Patent No. 1,714,721.

In Fig. 17 I have illustrated in diagram a complete conveyer wherein the chain passes horizontally around a curve of 90 degrees. In other words, the chain travels from one vertical plane to a second vertical plane at right angles to the first. In this instance, the conveyer chain 75 is mounted in the way heretofore described so as to travel on a conveyer frame 76 from a loading platform 77 to a discharging platform 78. At the latter end the chain passes over a sprocket wheel 79 similar to the wheel 70 just described. At its driving end, the chain passes over a similar wheel 80. The latter has its shaft provided with a gear wheel 81, which in turn meshes with a gear wheel 82 upon the shaft of an electric motor 83.

In the arrangement of Fig. 6 wherein the chain passes over a path which has a reverse curve, I have shown vertical guides 84 and 85 which are the equivalent of the wear plates 52 of the installation illustrated in Figs. 14 and 15. Since Fig. 6 is diagrammatic, it is believed that this will be a sufficient illustration of the guiding means.

In Fig. 6 the chain is represented as traveling in the direction of the arrow of that figure. Arrows in Figs. 14 and 17 also indicate the direction of travel of the upper stretch of the chain. The structure of the chain, however, is such that it can be run in either direction.

Obviously the degree of the curve around which the chain will travel in a horizontal plane, other things being equal, will depend upon the freedom of movement there is at the pivot points. The elements which enter into this problem will be obvious from what has been said before. Links of substantial dimensions can be retained and yet the radius of the curve around which the chain will travel will be quite short. Thus, with short links of the design of Figs. 7 and 8, a curve having a radius as low as 36 inches may be used.

In carrying out my invention, I do not wish to be limited to the particulars herein disclosed, but aim to cover by the terms of the appended claims all those alterations and modifications which rightly come within the scope of my invention.

What I claim as new and desire to secure by a patent of the United States is:

1. A conveyer chain composed of links each having a central block-like body provided with tooth-engaging surfaces, a central vertical leaf-like projection extending from one end of said body and a pair of similar outer projections extending from the other end of said body, said outer projections being spaced apart far enough to provide a slot wider than said central projection, the central projection of one link being adapted to fit loosely within the slot of the next link, thus providing for a limited lateral relative movement of the links as well as for the usual vertical movement, the upper surface of the chain being transversely crowned and the outer ends of said projections near said upper surface and the body corners in longitudinal alignment with said projections all being rounded to avoid interfering with articles being conveyed, and a transverse pivot pin for each set of interleaved projections loosely connecting the adjacent links to permit of said lateral and vertical movements.

2. A chain conveyer comprising a chain and a guideway therefor having rectilinear and horizontally curved paths, each chain-link having a central block-like body provided with tooth-engaging surfaces, a central vertical leaf-like projection extending from one end of said body and a pair of outer parallel vertical leaf-like projections extending from the other end of said body, said outer projections being spaced apart far enough to provide a slot wider than said central projection, the central projection of one link being adapted to fit loosely within the slot of the next link, thus providing for a limited lateral relative movement of the links as well as for the usual vertical movement, the upper surface of the chain being transversely crowned and the outer ends of said projections near said upper surface and the body corners in longitudinal alignment with said projections all being rounded to avoid interfering with articles being conveyed, a transverse pivot pin for each set of interleaved projections, loosely connecting the adjacent links to permit of their relative lateral and vertical movements, the ends of the pins extending beyond the outer surfaces of the links to provide wearing ends, the material of the pins being harder than the material of the links, and a wear plate in the guideway against which the ends of said pivot pins rub as said links move over said guideway.

3. A conveyer chain composed of links each having a central block-like body provided with tooth-engaging surfaces, a central vertical leaf-like projection extending from one end of said body and a pair of similar outer projections extending from the opposite end of said body, said outer projections being spaced apart far enough to provide a slot wider than said central projection, the central projection of one link being adapted to fit loosely in the slot of the next link thus providing for a limited lateral relative movement of the links as well as for the usual vertical movement, the upper surface of the chain being transversely crowned and the outer ends of said projections being rounded top and bottom, the lower portions of said projections serving as runners for traveling on a flat guiding surface, the body corners on the upper portions of said links in longitudinal alignment with said projections also being rounded to avoid interfering with articles being conveyed, and a transverse pivot pin for each set of interleaved projections loosely connecting the adjacent links to permit of their relative lateral and vertical movements.

4. A chain conveyer comprising a chain and a guideway therefor having rectilinear and horizontally curved pathways, each chain link having a central block-like body having tooth-engaging surfaces, a central vertical leaf-like projection extending from one end of said body and a pair of substantially parallel vertical leaf-like projections extending from the opposite end of said body said outer projections being spaced far enough apart to provide a slot wider than said central projection, the central projection of one link being adapted to fit loosely within the slot of the next link, thus providing for a limited lateral relative movement of the links as well as for the usual vertical movement, the upper surface of the chain being transversely crowned and the outer ends of said projections being rounded top and bottom, the lower portions of said projections serving as runners for traveling on a flat-guiding surface, the body corners on the upper portions of said links in longitudinal alignment with said projections also being rounded to avoid interfering with articles being conveyed, a transverse pivot pin for each set of interleaved projections loosely connecting the adjacent links to permit of their relative movement vertically and laterally, the ends of the pins extending beyond the outer surfaces of the links to provide wearing ends, the material of the pins being harder than the material of the links, and a wear plate in the guideway against which the ends of said pivot pins rub as said links move over said guideway.

5. A conveyer chain composed of links each having a central block-like body provided with tooth-engaging surfaces, a central vertical leaf-like projection extending from one end of said body and a pair of outer substantially parallel vertical leaf-like projections extending from the other end of said body, said outer projections being spaced apart far enough to provide a slot wider than said central projection, the central projection of one link being adapted to fit loosely within the slot of the next link, the central projection having its vertical walls toward one end of the link converging outward and the outer parallel projections having their opposing vertical walls toward the other end of the link diverging outward and the upper surface of the chain being transversely crowned and the outer ends of said links being rounded top and bottom, the lower portions of said projections serving as runners for traveling on a flat guiding surface, the body corners on the upper portions of said links in longitudinal alignment with said projections also being rounded to avoid interfering with articles being conveyed, a transverse pin extending through openings in each set of interleaved projections, said pivot pin being secured in each case to said outer parallel projections and passing through an enlarged opening in the central projection, the pin being cylindrical where it engages said central projection and the walls of the enlarged opening in said projection being tapered inward from opposite ends of the opening to provide a good bearing surface for the pin for all positions of the links both in and out of vertical alignment.

6. A chain conveyer comprising a chain and a guideway therefor having rectilinear and horizontally curved paths for the chain each chain link having a central block-like body provided with tooth-engaging surfaces, a central vertical leaf-like projection extending from one end of said body and a pair of outer substantially parallel vertical leaf-like projections extending from the opposite end of said body, said outer projections being spaced far enough apart to provide a slot wider than said central projection, the central projection of one link being adapted to fit loosely within the slot of the next link, thus providing for a limited lateral relative movement of the links as well as for the usual vertical movement, the vertical walls of the central projection near its outer end converging outward, the opposing vertical walls of the outer parallel projections near their outer ends diverging outward, the upper surface of the chain being transversely crowned and the outer ends of said links being rounded top and bottom, the lower portions of said projections constituting runners for traveling on said guideway, the body corners on the upper portions of said links in longitudinal alignment with said projections also being rounded to prevent interfering with articles being conveyed, a horizontal pivot pin for each set of interleaved projections, each pin being fixed near its ends in openings in the outer parallel projections of one link and passing near its center through an enlarged opening in the central projection of the next link, the ends of each pin extending beyond the outer surfaces of the link to provide wearing ends, the material of the pins being harder than the material of the link, each pin being cylindrical where it engages said central projection and the walls of the enlarged opening in said central projection being tapered inward at each end of said opening to provide a good bearing surface for the pin when the links are moved horizontally relative to each other, and a vertical wear plate in said guideway against which the ends of said pivot pins rub as said links move over said guideway, whereby the chain is able to flex vertically to pass over driving and guide wheels and horizontally to follow the curved paths of said guideway.

7. A conveyer chain composed of links each having a central block-like body provided with tooth-engaging surfaces, a central vertical leaf-like projection extending from one end of said body and a pair of outer substantially parallel vertical leaf-like projections extending from the other end of said body, said outer projections being spaced apart far enough to provide a slot wider than said central projection, the central projection of one link being adapted to fit loosely within the slot of the next link, the central projection having its vertical walls toward one end of the link converging outward and the outer parallel projections having their opposing vertical walls toward the other end of the link diverging outward and the upper surface of the chain being transversely crowned and the outer ends of said links being rounded top and bottom, the lower portions of said projections serving as runners for traveling on a flat guiding surface, the body corners on the upper portions of said links in longitudinal alignment with said projections also being rounded to avoid interfering with articles being conveyed, a transverse pin extending through openings in each set of interleaved projections, said pivot pin being secured in each case to the central projection and extending through enlarged openings in said outer parallel projections.

8. A chain conveyer comprising a chain and a guideway therefor having rectilinear and horizontally curved paths for the chain, each chain link having a central block-like body provided with tooth-engaging surfaces, a central vertical leaf-like projection extending from one end of said body and a pair of outer substantially parallel vertical leaf-like projections extending from the opposite end of said body, said outer projections being spaced far enough apart to provide a slot wider than said central projection, the central projection of one link being adapted to fit loosely within the slot of the next link, thus providing for a limited lateral relative movement of the links as well as for the usual vertical movement, the vertical walls of the central projection near its outer end converging outward, the opposing vertical walls of the outer parallel projections near their outer ends diverging outward, the upper surface of the chain being transversely crowned and the outer ends of said links being rounded top and bottom, the lower portions of said projections constituting runners for traveling on said guideway, the body corners on the upper portions of said links in longitudinal alignment with said projections also being rounded to prevent interfering with articles being conveyed, a horizontal pivot pin for each set of interleaved projections, each pin being fixed near its center in the opening in the central projection of one link and having its ends extending through enlarged openings in the outer parallel projections of the next link, the ends of each pin extending beyond the outer surfaces of the link to provide wearing ends, the material of the pins being harder than the material of the links, and a vertical wear plate in said guideway against which the ends of said pivot pins rub as said links move over said guideway, whereby the chain is able to flex vertically to pass over driving and guide wheels and horizontally to follow the curved paths of said guideway.

In witness whereof, I hereunto subscribe my name this 30th day of March, A. D. 1929.

JULIUS J. MOJONNIER.